2,865,865

PREPARATION OF A STABILIZED RANEY NICKEL CATALYST

Charles Ockrent, Gerald Ernest Hamor Skrimshire, and Alan John Sutherland, London, England, assignors to The British Drug Houses Limited, London, England, a British company No Drawing. Application April 19, 1956
Serial No. 579,126

Claims priority, application Great Britain April 25, 1955

7 Claims. (Cl. 252—430)

This invention is for improvements in or relating to the preparation of a stabilized Raney nickel catalyst.

The finely divided form of nickel, known as Raney nickel, which is extensively used in chemical processes as a catalyst in effecting reduction with hydrogen under moderate conditions of temperature and pressure, may be prepared by dissolving out the aluminum from nickel aluminum alloys by means of sodium hydroxide solution.

The dried catalyst is pyrophoric and usually therefore it is prepared as required and stored under water. This property has hitherto made it impracticable to market a ready-made form of Raney nickel and research workers and others who wish to use it have to prepare the catalyst themselves. This is a time-consuming operation and requires considerable skill and experience in order to produce a fully active catalyst.

Another form of nickel catalyst obtained by reducing nickel oxide by means of hydrogen or by heating nickel formate has been marketed as a suspension in hardened vegetable oil and this form of nickel has been used directly in the hydrogenation of vegetable oil. A similar product cannot be made from Raney nickel because the special catalytic properties are injuriously affected and the activity of the Raney nickel is largely or entirely lost.

We have found, however, that although many higher fatty acids and esters injuriously affect the activity of Raney nickel, the higher fatty alcohols of chain-length from 16 to 26 carbon atoms inclusive do not produce any deleterious action, and consequently a solidified suspension of Raney nickel in such higher fatty alcohol forms a stable preparation of the catalyst from which the latter can readily be obtained by removal of the fatty alcohol by a suitable solvent such as ethyl or methyl alcohol.

According to the present invention there is provided a method for the preparation of a stabilised Raney nickel catalyst which comprises forming a solidified suspension of Raney nickel in a fatty alcohol having from 16 to 26 carbon atoms inclusive.

The solid suspension is quite stable in air at room temperature and even after six months storage the catalytic activity of the nickel can be made fully available by dissolving out the fatty alcohol by means of ethyl alcohol or other suitable solvent.

The fatty alcohol is preferably cetyl alcohol but octadecyl (stearyl) alcohol and ceryl alcohol which are readily available and relatively inexpensive may also be employed. Mixtures of fatty alcohols having from 16 to 26 carbon atoms inclusive may also be used. It is inconvenient to use alcohols higher than ceryl because of the relatively high melting point. Ethyl alcohol, by reason of its relative cheapness and ready availability, is the preferred solvent for removing the fatty alcohol when the catalyst is required for use.

The percentage by weight of Raney nickel in the solidified suspension may vary from approximately 20 percent to 50 percent. The smaller the proportion of the Raney nickel in the suspension the greater the amount of fatty alcohol to be removed, and this necessitates the use of more alcohol or other solvent and the wastage of a correspondingly larger amount of fatty alcohol. If the suspension contains a proportion of catalyst in the upper portion of the range above referred to it becomes too soft to handle conveniently. With cetyl alcohol, for example, the proportion of catalyst should not exceed 40 percent and in general it is preferred to employ preparations containing 25 to 30 percent by weight Raney nickel.

Following is a description by way of example of methods of preparing a stabilised catalyst according to the present invention:

Example I

A dense black residue remaining after treatment of 480 g. of 50/50 nickel/aluminum alloy with sodium hydroxide as described in United States specification No. 1,563,587 is washed with water by decantation until free from alkali and then washed in a similar manner with 1 litre of industrial methylated spirit followed by three washings with 400 ml. quantities of anhydrous industrial methylated spirit. The washed sludge is allowed to settle and any remaining liquid is removed by suction through a tube. Alternatively the suspension may be centrifuged and the liquor decanted. 745 g. of cetyl alcohol heated to 65° C. are added with stirring and when homogeneous, the mixture is poured into a mould, previously warmed to 38 to 40° C. and cast in the form of rods 12 mm. in diameter. When set, the rods are removed from the mould and cut into 20 mm. lengths each containing approximately 0.5 g. active nickel catalyst.

The Raney nickel can be obtained from the solid suspension by the following procedure:

Two of the 20 mm. rods prepared as described above are treated at 30° C. with 75 ml. of dry industrial alcohol or a similar quantity of methyl alcohol until the cetyl alcohol is dissolved. The resulting suspension is allowed to settle, assisted if desired in a centrifuge, the solution decanted and the residue washed by decantation with three 25 ml. quantities of ethyl or methyl alcohol. A portion of the final washing is diluted with water. If a clear solution is obtained, the catalyst is free from cetyl alcohol and is ready for use.

Example II

A washed sludge of nickel obtained from the treatment of 2 kg. of 50% Raney alloy in a manner similar to that described in Example I was further washed by decantation with 4 litres of industrial methylated spirit followed by three washings with 1.5 litre quantities of anhydrous industrial spirit. The sludge was allowed to settle and any remaining alcohol removed by centrifuging. 2 kg. of stearyl alcohol heated to 65° C. was added with stirring and when homogeneous, the mixture was poured into a water-cooled rectangular mould. When set, the resulting slab was removed from the mould and cut into suitable portions.

We claim:

1. A method for the preparation of a stabilized Raney nickel catalyst which comprises mixing from approximately 20 to 50% of Raney nickel with a fatty alcohol having from 16 to 26 carbon atoms, inclusive, said fatty alcohol being at a sufficiently elevated temperature to enable said mixing to take place, then cooling the resulting mixture to form a solidified suspension of Raney nickel in said fatty alcohol.

2. A method as claimed in claim 1 wherein said fatty alcohol is cetyl alcohol.

3. A method as claimed in claim 1 wherein said fatty alcohol is stearyl alcohol.

4. A method as claimed in claim 1 wherein said fatty alcohol is ceryl alcohol.

5. A method as claimed in claim 1 wherein the percentage by weight of Raney nickel in said solidified suspension is between 25 and 30%.

6. A method for the preparation of a Raney nickel catalyst which comprises forming a solidified suspension of Raney nickel in a fatty alcohol having from 16 to 26 carbon atoms inclusive, the percentage by weight of Raney nickel for said solidified suspension being between approximately 20% and 50%, and when the catalyst is required for use dissolving out said fatty alcohol by means of a solvent selected from the group consisting of methyl and ethyl alcohol.

7. A stabilized Raney nickel catalyst consisting essentially of a solidified suspension of Raney nickel in a fatty alcohol having from 16 to 26 carbon atoms inclusive, the percentage by weight of Raney nickel in said solidified suspension being between approximately 20% and 50%.

References Cited in the file of this patent

UNITED STATES PATENTS

| | | |
|---|---|---|
| 2,014,198 | Bolton et al. | Sept. 10, 1935 |
| 2,163,602 | Jenness | June 27, 1939 |
| 2,185,194 | Harris | Jan. 2, 1940 |
| 2,344,671 | Bertsch | Mar. 21, 1944 |
| 2,662,836 | Montgomery et al. | Dec. 15, 1953 |
| 2,677,669 | Ahlberg | May 4, 1954 |

OTHER REFERENCES

J. Am. Chem. Soc., vol. 71 of 1949, pp. 3769–3771.